(12) United States Patent
Gorgolewsk

(10) Patent No.: US 12,038,963 B2
(45) Date of Patent: Jul. 16, 2024

(54) DETERMINING TYPES OF DIGITAL COMPONENTS TO PROVIDE

(71) Applicant: Google LLC, Mountain View, CA (US)

(72) Inventor: Krzysztof Jacek Gorgolewsk, Irvine, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/008,759

(22) PCT Filed: Nov. 19, 2020

(86) PCT No.: PCT/US2020/061256
§ 371 (c)(1),
(2) Date: Dec. 7, 2022

(87) PCT Pub. No.: WO2022/108587
PCT Pub. Date: May 27, 2022

(65) Prior Publication Data
US 2023/0222151 A1   Jul. 13, 2023

(51) Int. Cl.
*G06F 16/435* (2019.01)
*G06N 20/20* (2019.01)

(52) U.S. Cl.
CPC ........... *G06F 16/435* (2019.01); *G06N 20/20* (2019.01)

(58) Field of Classification Search
CPC .... G06F 16/248; G06F 16/285; G06F 16/433; G06F 16/435; G06F 16/635;
(Continued)

(56) References Cited

U.S. PATENT DOCUMENTS 7,835,939 B1    11/2010   Karlsson
10,917,310 B2 *  2/2021   So ......................... G06F 16/953
(Continued)

FOREIGN PATENT DOCUMENTS

KR    2017-0142342    12/2017

OTHER PUBLICATIONS

Summons to Attend Oral Proceedings pursuant to Rule 115 (1) EPC in European Appln. No. 20824820.3, dated Jul. 31, 2023, 10 pages.
(Continued)

*Primary Examiner* — Robert W Beausoliel, Jr.
*Assistant Examiner* — Cheryl M Shechtman
(74) *Attorney, Agent, or Firm* — Fish & Richardson P.C.

(57) ABSTRACT

Methods, systems, and apparatus, including computer programs encoded on a computer storage medium, for determining and recommending the types of digital components that content providers can generate and provide for distribution to client devices. In one aspect, a method can determine whether a content provider has not previously provided a first digital component of a first media type. A first set of user interaction data can be obtained and input into a machine learning model. The model can can output result data for expected affirmative user actions related to the first digital component of the first media type. Based on the result data, a recommendation specifying whether the content provider should provide the first digital component of the first media type can be generated and provided to the content provider.

20 Claims, 4 Drawing Sheets

(58) Field of Classification Search
CPC .............. G06F 16/9038; G06F 16/906; G06F 16/9538; G06N 20/00
See application file for complete search history.

(56) References Cited

U.S. PATENT DOCUMENTS

| | | | |
|---|---|---|---|
| 11,163,843 B1* | 11/2021 | Li | ........................ G06F 16/906 |
| 2013/0339126 A1 | 12/2013 | Cui et al. | |
| 2014/0068011 A1* | 3/2014 | Zhang | ..................... H04L 67/53 |
| | | | 709/219 |
| 2018/0040019 A1* | 2/2018 | Gavlovski | ......... G06F 16/24578 |
| 2018/0040029 A1* | 2/2018 | Zeng | ................. G06Q 30/0277 |
| 2018/0218287 A1* | 8/2018 | Wang | ................. G06Q 30/0201 |
| 2018/0336574 A1* | 11/2018 | Mohan | ............... G06Q 30/0201 |
| 2019/0373331 A1* | 12/2019 | Benzatti | ............. H04N 21/4668 |
| 2020/0320592 A1 | 10/2020 | Soule et al. | |
| 2022/0005070 A1* | 1/2022 | Raviv | ................ G06Q 30/0269 |

OTHER PUBLICATIONS

Office Action in Indian Appln. No. 202327006544, dated Aug. 1, 2023, 10 pages (with English translation).
International Search Report and Written Opinion in International Appln. No. PCT/US2020/061256, mailed on Jul. 16, 2021, 16 pages.
International Preliminary Report on Patentability in International Appln. No. PCT/US2020/061256, mailed on Jun. 1, 2023, 11 pages.
Office Action in European Appln. No. 20824820.3, mailed on Apr. 9, 2024, 16 pages.

* cited by examiner

DETERMINING TYPES OF DIGITAL COMPONENTS TO PROVIDE

CROSS-REFERENCE TO RELATED APPLICATIONS

This application is a National Stage Application under 35 U.S.C. § 371 and claims the benefit of International Application No. PCT/US2020/061256, filed Nov. 19, 2020, the entirety of which is incorporated herein by reference.

BACKGROUND

This specification generally relates to data processing and in particular, to determining and recommending the types of digital components that content providers can generate and provide for distribution to client devices.

A content provider can generally generate and provide digital components of various media types (e.g., audio, video). Generating a digital component can consume a significant number of resources (e.g., computing, network, power resources). Once generated, a content platform can display, within an application (e.g., a browser) executing on a client device, one or more digital components that may be generated and/or provided by the content provider.

SUMMARY

In general, one innovative aspect of the subject matter described in this specification can be embodied in methods including the operations of determining that a content provider has not previously provided a first digital component of a first media type, including determining that the content provider has previously provided digital components of one or more media types other than the first media type; obtaining a first set of user interaction data representative of interactions by a plurality of users with digital components provided by the content provider; inputting the first set of user interaction data into a machine learning model, wherein: the machine learning model is trained on (i) historical user interaction data for digital components of the first media type that are provided by a plurality of other content providers and (ii) corresponding data for affirmative user actions relating to the digital components of the first media type, the machine learning model outputs data for expected affirmative user actions related to a particular digital component of the first media type based on an input set of user interaction data, and affirmative user action relating to a digital component represents performance by a user of a target action after an initial user interaction with the digital component; obtaining, from the machine learning model and based on the first set of user interaction data, result data for expected affirmative user actions related to the first digital component of the first media type; determining, based on the result data for expected affirmative user actions related to the first digital component of the first media type, a recommendation specifying whether the content provider should provide the first digital component of the first media type; and providing, to the content provider, the recommendation specifying whether the content provider should provide the digital component of the first media type.

Other embodiments of this aspect include corresponding methods, apparatus, and computer programs, configured to perform the actions of the methods, encoded on computer storage devices. These and other embodiments can each optionally include one or more of the following features.

In some implementations, the first media type can include comprises one of video, audio, image, or text.

In some implementations, first user interaction data can include data indicating to one or more of the following: one or more characteristics of the plurality of users, one or more characteristics of a plurality of client devices correspond to the plurality of users, a number of user interactions with one or more digital components of the first media type, and a duration of user interactions with one or more digital components of the first media type.

In some implementations, the machine learning model can use gradient boosting ensemble techniques.

In some implementations, the machine learning model can correspond to one of a plurality of different machine learning models that each correspond to a different media type.

In some implementations, data relating to affirmative user actions that are expected for the first digital component of the first media type can include at least one of: a first data item specifying an expected number of resources consumed in obtaining an expected affirmative user action relating to the first digital component of the first media type; or a second data item representing an expected number of affirmative user actions relating to the first digital component of the first type relative to the expected number of resources consumed.

In some implementations, determining the recommendation can include: determining whether (1) the first data item satisfies a first threshold and (2) the second data item satisfies a second threshold; and generating the recommendation based on whether the (1) the first data item satisfies the first threshold and (2) the second data item satisfies the second threshold, including: generating a recommendation specifying that the content provider should provide the first digital component of the first media type when (1) the first data item satisfies the first threshold and (2) the second data item satisfies the second threshold; and generating a recommendation specifying that the content provider should not provide the first digital component of the first media type when (1) the first data item satisfies the first threshold and (2) the second data item satisfies the second threshold.

Particular embodiments of the subject matter described in this specification can be implemented to enable resource efficient generation and provision of digital components. Content providers generally expend a significant number of computing, network, and power resources to generate digital components of various media types. In instances where a content provider has not previously provided a digital component of a particular media type (e.g., video), the content provider generally cannot leverage the resource efficiencies that can come with generating digital components of media types that the content provider has previously generated/ provided. In other words, the resources required and consumed in generating a digital component of a new media type (i.e., a media type for which the content provider has previously not provided/generated a digital component) are generally greater relative to resources required and consumed when generating a digital component of a media type for which the content provider has previously generated/ provided digital components. Moreover, in such instances, due to the content provider's lack of familiarity with the provision and distribution of digital components of the new media type, the content provider generally cannot estimate the user interactions and/or affirmative user actions (which represents performance by a user of a target action after an initial user interaction with the digital component) with respect to the generated digital component of the new media type. Indeed, it is possible that the new digital component may not get a threshold number of user interactions/affirmative user actions, which in turn could result in the digital component being taken out of service (i.e., it no longer being provided to content platforms and/or being removed from the stored inventory of digital components). In the event that the digital component is taken out of service, the computing, power, and network resources consumed in generating, storing, and providing the digital component are effectively wasted and unrecoverable.

In contrast, the techniques described in this specification utilize a trained model (e.g., a machine learning model) to estimate the user interactions and/or affirmative user actions with respect to a digital component of a new media type—prior to the expenditure of resources required in generating, storing, and providing such a digital component. If the content provider determines that the digital component of the new media type is not estimated to get a threshold number of user interactions and/or affirmative user actions, the content provider can divert the resources that would otherwise be expended in generating and providing the digital component of the new media type, toward the generation and provision of digital components of other media types. In doing so, significant resource efficiencies and savings can be achieved in the generation and provision of digital components.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
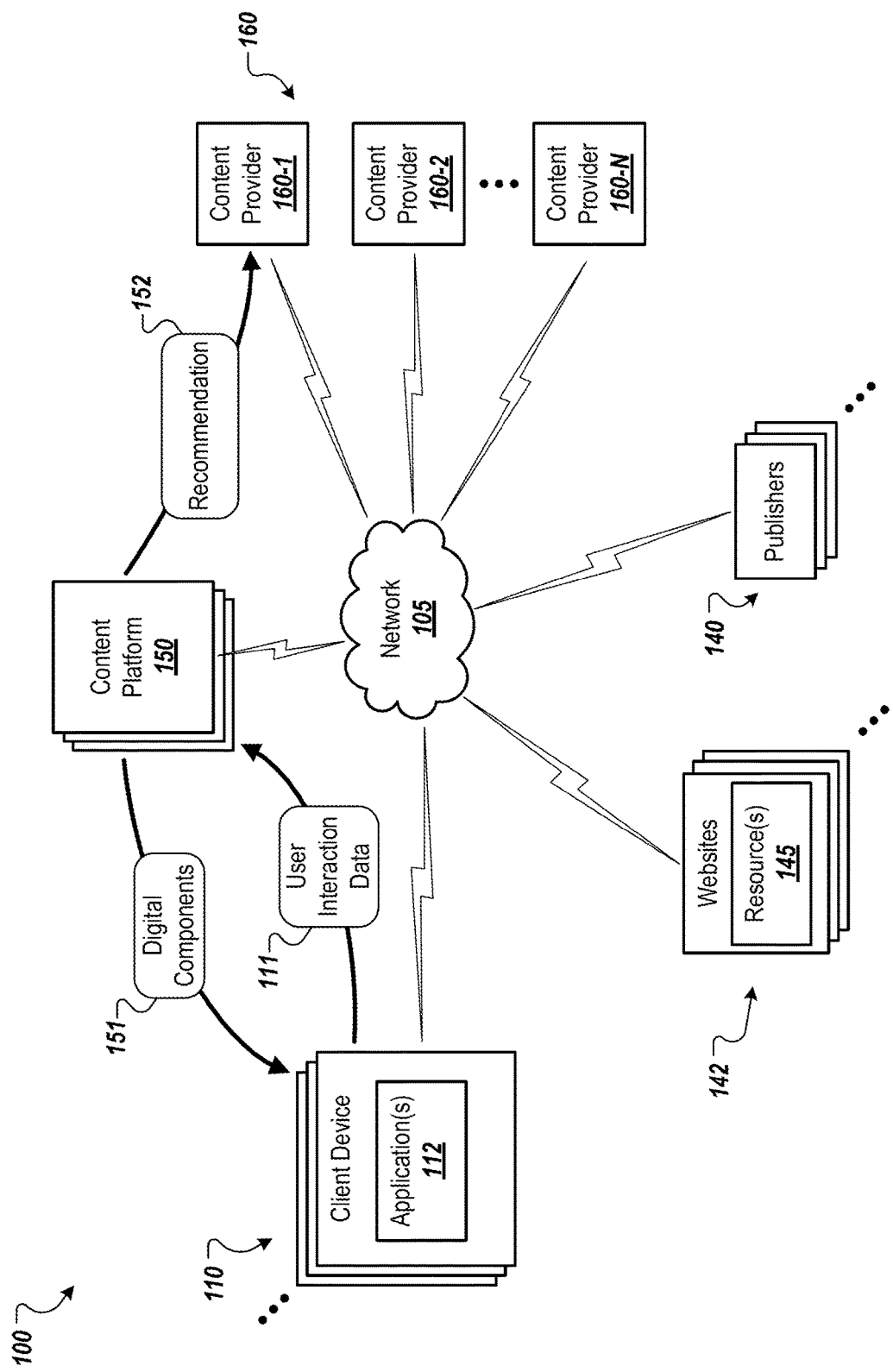
FIG. 1 is a block diagram of an example environment in which digital content is distributed and provided for display on client devices.

This specification generally describes systems and techniques determining and recommending the generation and provision of digital components of particular media types, including media types for which a content provider has previously not generated and/or provided digital components.

As summarized below and described in greater detail throughout this document, the techniques described herein enable a content provider's system to estimate the user interactions and/or affirmative user actions with respect to a digital component of a new media type—prior to the expenditure of the resources required in generating, storing, and providing such a digital component.

In some implementations, the content provider's system can include a content provider data management engine that is deployed along with one or more machine learning models and a recommendation generation engine that provides recommendations to the content provider's administrator regarding whether to provide digital components of a new media type. As used in this specification, an engine includes any data processing apparatus that includes hardware and/or software, and that is configured to perform one or more operations.

The content provider data management engine communicates with one or more machine learning models to estimate the affirmative user actions that are expected from the provision and storage of a digital component of a new media type, which is also referred to herein as a "first media type" (i.e., a media type for which the content provider has previously not provided/generated a digital component). In some implementations, the content provider management engine obtains interaction data from multiple client devices with respect to digital components provided by the content provider. The interaction data can include, e.g., data indicating one or more characteristics about the client device and their respective environments, data relating to the nature, number, and/or duration of user interactions with one or more digital components, data relating to the affirmative user actions occurring after an initial user interaction with the digital component of the new media type, or a combination thereof.

The content provider data management engine provides the obtained interaction data to a machine learning model (e.g., a model that uses gradient boost ensemble techniques) that is trained on (i) historical user interaction data for digital components of the new/first media type that are provided by multiple other content providers and (ii) corresponding data for affirmative user actions relating to the digital components of the first media type. Based on the input interaction data, the machine learning model outputs values for one or more data items related to the expected affirmative user actions for a particular digital component of the new/first media type. This set of data items can include, e.g., data specifying an expected quantity of resources consumed in distributing digital components of the first media type to the plurality of users on behalf of the content provider, data specifying an expected quantity of affirmative actions performed by users following initial user interactions with the digital component of the first media type, or a combination thereof.

Based on this data output by the machine learning model, the recommendation generation engine determines a recommendation specifying whether the content provider should provide the digital component of the new/first media type. In some implementations, the recommendation generation engine compares the value for each data item (examples of which are described in the previous paragraph) output by the machine learning model to a respective predetermined threshold for that data item. In some implementations, if the recommendation generation engine determines that the value for each data item satisfies (e.g., meets or exceeds) the pre-determined threshold for that data item, the recommendation generation engine generates a recommendation specifying that the content provider should provide the digital component of the new/first media type. On the other hand, if the recommendation generation engine determines that the value for one or more data item does not satisfy (e.g., is less than) the pre-determined threshold for that data item, the recommendation generation engine generates a recommendation specifying that the content provider should not provide the digital component of the new/first media type.

These features and additional features are further described in greater detail below with reference to FIGS. 1-4.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which digital content is distributed and provided for presentation on client devices.

The example environment 100 includes a data communication network 105, which can include a local area network (LAN), a wide area network (WAN), the Internet, or a combination thereof. The network 105 can also include any type of wired and/or wireless network, satellite networks, cable networks, Wi-Fi networks, mobile communications networks (e.g., 3G, 4G, and so forth), or any combination thereof. The network 105 can utilize communications protocols, including packet-based and/or datagram-based protocols such as internet protocol (IP), transmission control protocol (TCP), user datagram protocol (UDP), or other types of protocols. The network 105 can further include a number of devices that facilitate network communications and/or form a hardware basis for the networks, such as switches, routers, gateways, access points, firewalls, base stations, repeaters or a combination thereof.

The network 105 connects the client devices 110, publishers 140, websites 142, content platforms 150, and content providers 160. The example environment 100 may include many different client devices 110, publishers 140, websites 142, content platforms 150, and content providers 160.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hot word" or "hot phrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher upon execution of the native application on the client device 110.

Some resources, application pages, or other application content can include digital component slots for presenting digital components with/within the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files. For example, the digital component may be content that is intended to supplement content of a web page or other resource presented by the application 112. More specifically, the digital component may include digital content that is relevant to the resource content (e.g., the digital component may relate to a topic that is the same as or otherwise related to the topic/content on the web page). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

A content platform 150 is a computing platform that enables distribution of digital components and other content. Example content platforms 150 include search engines, social media platforms, new platforms, data aggregator platforms, or other content sharing platforms. Each content platform 150 may be operated by a content platform service provider.

The content platform 150 can publish and make available its own content. For example, the content platform 150 may be a news platform, which publishes its own news articles. The content platform 150 may also present content (e.g., digital components) provided by one or more content providers 160 that are not part of the content platform 150. In the above example, the news platform may also present third party content provided by one or more content providers 160 and/or publishers 140. As another example, the content platform 150 may be a data aggregator platform that does not publish its own content, but aggregates and presents third party content provided by different content providers 160 and/or publishers 140. In some implementations, the content platforms 150 manage the selection and distribution of digital components on behalf of publishers 140 and/or content providers 160.

The content platforms 150 can include supply-side platforms (SSPs) and demand-side platforms (DSPs). Some publishers 140 use an SSP to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or multiple SSPs. Some publishers 140 may use the same SSP.

Content providers 160 can create (or otherwise publish) digital components that are presented in digital component slots of publisher's resources and applications. The content providers 160 can use a DSP to manage the provisioning of its digital components for presentation in digital component slots. A DSP is a technology platform implemented in hardware and/or software that automates the process of distributing digital components for presentation with the resources and/or applications. A DSP can interact with multiple supply-side platforms SSPs on behalf of content providers 160 to provide digital components for presentation with the resources and/or applications of multiple different publishers 140. In general, a DSP can receive requests for digital components (e.g., from an SSP), generate (or select) a selection parameter for one or more digital components created by one or more content providers based on the request, and provide data related to the digital component (e.g., the digital component itself) and the selection parameter to an SSP. The SSP can then select a digital component for presentation at a client device 110 and provide, to the client device 110, data that causes the client device 110 to present the digital component. As mentioned above, in some examples, the content platforms 150 can include one or more of the aforementioned SSPs and/or DSPs.

In operation, the content platforms 150 distribute various digital components 151 to different client devices 110 on behalf of content providers 160. The content platforms 150 can be configured to distribute digital components 151 of different media types for different content providers 160. That is, for each of the content providers 160, the content platforms 150 may be configured to distribute digital components of a respective subset of k different media types. The k different media types can, for instance, include video, text, audio, images, and so on. For example, the content platforms 150 may distribute digital components of a first media type (e.g., video), from among the k different media types, to various client devices 110 on behalf of content provider 160-2, distribute digital components of a second media type (e.g., text) and digital components of a third media type (e.g., audio), from among the k different media types, to various client devices 110 on behalf of content provider 160-1, and distribute digital components of the first media type (e.g., video), digital components of the second media type (e.g., text), and digital components of a fourth media type (e.g., images), from among the k different media types, to various client devices 110 on behalf of content provider 160-N.

In operation, the content platforms 150 also receive user interaction data 111 from the various client devices 110 to which digital components 151 are distributed. The user interaction data 111 that is transmitted to the content platforms 150 by each client device 110 can include data indicative of one or more characteristics of the respective client device 110 and/or a user of the respective client device 110 (e.g., device type, device preference information, usage information, contextual information, user profile, user interests, etc.), data indicative of user interaction with one or more digital components 151 distributed to the respective client device 110 (e.g., data relating to the time spent viewing one or more digital components, a selection (click, touch) of one or more digital components, etc.), data indicative of affirmative actions performed by a user of the respective client device 110 following an initial user interaction with one or more digital components 151 distributed to the respective client device 110 (e.g., data relating to a user's performance of one or more predetermined interactions(s) or other user activity with a digital component after an initial user interaction with this digital component, data relating to a user's performance of one or more predetermined interactions or other user activity with a digital component or resource after being redirected to this digital component/component based on a user interaction with another digital component, etc.), or a combination thereof. For example, an affirmative user action can include an interaction with a particular digital component or web page, such as, e.g., viewing the particular digital component for a certain duration or entering and submitting data within a form presented on a web page, after an initial interaction (e.g., a click or selection) with a digital component.

As such, some portions of user interaction data 111 are transmitted to the content platforms 150 by each client device 110 following the distribution of one or more digital components 151 to the respective client device 110, while other portions of user interaction data 111 may be transmitted to the content platforms 150 by the respective client device 110 before or after the distribution of such one or more digital components 151 to the respective client device 110. Furthermore, as the content platforms 150 distribute additional digital components 151 to client devices 110 on behalf of content providers 160, the content platforms 150 may also receive additional user interaction data 111 from such client devices 110. Upon receiving user interaction data 111, the content platforms 150 can store, process, and/or utilize such user interaction data 111 to generate additional data. As described in further detail below, in some implementations, the content platforms 150 may utilize user interaction data 111 received from client devices 110 to train one or more machine learning models, provide user interaction data 111 received from client devices 110 as input to one or more machine learning models, or both.

In some implementations, one or more of the content platforms 150 may maintain or otherwise have access to one or more machine learning models, such as, e.g., gradient boosted decision trees (GBDTs) or ridge regression. In some examples, one or more of these machine learning models may be similar or equivalent to one or more of machine learning models 240 as described in further detail with reference to FIG. 2. In some implementations, the machine learning models can include a separate machine learning model for each of the k different digital component media types. As such, in at least some of these implementations, one or more of the content platforms 150 may maintain or otherwise have access to k different machine learning models. For example, in some such implementations, one or more of the content platforms 150 may maintain or otherwise have access to a first machine learning model corresponding to digital components of a first media type (e.g., video), a second machine learning model corresponding to digital components of a second media type (e.g., text), a third machine learning model corresponding to digital components of a third media type (e.g., audio), a fourth machine learning model corresponding to digital components of a fourth media type (e.g., images), and so on. Alternatively, in some implementations, a single machine learning model can be implemented and can correspond to digital components of different media types. For convenience, the subsequent disclosures will refer to the implementation of a separate machine learning model for each of the k different digital component media types. However, it will be appreciated that the same techniques are applicable to the implementation where a single machine learning model is used.

Each machine learning model can be trained based on user interaction data 111 received from client devices 110 to which digital components 151 of the corresponding media type are distributed, as well as data specifying one or more quantities corresponding to the distribution of digital components 151 of the corresponding media type. Such data specifying one or more quantities corresponding to the distribution of digital components 151 of the corresponding media type can correspond to data maintained by one or more of the content platforms 150 and/or determined by one or more of the content platforms 150 based on user interaction data 111 received from client devices 110 to which digital components 151 of the corresponding media type are distributed, data received from content providers 160, and/or other data. In some implementations, such data specifying one or more quantities corresponding to the distribution of digital components 151 of the corresponding media type can include data specifying a quantity of resources (e.g., power, bandwidth, costs, time, etc.) consumed in distributing digital components 151 of the corresponding media type to client devices 110, data specifying a quantity of affirmative actions performed by users of such client devices 110 following initial user interactions with one or more digital components 151 of the corresponding media type, data representing a ratio between the aforementioned quantity of resources consumed and the aforementioned quantity of affirmative actions performed, or a combination thereof.

For example, if one or more of the content platforms 150 have distributed one or more digital components of the first media type (e.g., video) to a first subset of client devices 110 on behalf of content provider 160-2 and have also distributed one or more digital components of the first media type (e.g., video) to a second subset of client devices 110 on behalf of content provider 160-N, then the aforementioned first machine learning model corresponding to digital components of the first media type (e.g., video) can be trained using user interaction data 111 received from the first and second subsets of client devices 110, as well as data specifying one or more quantities corresponding to the distribution of digital components of the first media type (e.g., video) to the first and second subsets of client devices 110.

In this example, the user interaction data 111 received from each client device in the first or second subset of client devices 110 can include data indicative of one or more characteristics of the respective client device 110 and/or a user of the respective client device 110, data indicative of user interaction with one or more digital components 151 of the first media type (e.g., video) distributed to the respective client device 110, data indicative of affirmative actions performed by the user of the respective client device 110 following an initial user interaction with one or more digital components 151 of the first media type (e.g., video) distributed to the respective client device 110, or a combination thereof.

Similarly, in this example, the data specifying one or more quantities corresponding to the distribution of digital components of the first media type (e.g., video) to the first and second subsets of client devices 110 can, in some implementations, include data specifying a quantity of resources (e.g., power, bandwidth, costs, time, etc.) consumed in distributing digital components 151 of the first media type (e.g., video) to the first and second subsets of client devices 110, data specifying a quantity of affirmative actions performed by users of the first and second subsets of client devices 110 following initial user interactions with one or more digital components 151 of the first media type (e.g., video), data representing a ratio between the aforementioned quantity of resources consumed and the aforementioned quantity of affirmative actions performed, or a combination thereof.

Once trained, a machine learning model that corresponds to a particular media type (e.g., video) can be configured to receive, as input, user interaction data 111 of a set of client devices 110 to which digital components 151 of one or more media types (e.g., one or more media types other than the particular media type, one or more media types including the particular media type) was provided by a content provider, and generate, as output, data specifying one or more expected quantities corresponding to the distribution of digital components of the particular media type to the particular subset of client devices 110. In this way, the user interaction data 111 obtained in connection with the distribution of digital components of one or more media types on behalf of a given content provider may be leveraged to provide insights into one or more expected quantities corresponding to the distribution of digital components of a particular media type, even if digital components of this particular media type have previously not been distributed by the content platforms 150 on behalf of the given content provider.

In some implementations, for each of content providers 160, one or more of the content platforms 150 may determine whether the respective content provider has not previously provided digital components of any of the k different media types for distribution.

In some implementations, in response to determining that the respective content provider has not previously provided digital components of, e.g., a particular media type (e.g., video) for distribution, leverage user interaction data 111 obtained in connection with the distribution of digital components (e.g., of one or more media types other than the particular media type) on behalf of the respective content provider in conjunction with one or more of the k different machine learning models to provide insights into one or more expected quantities corresponding to the distribution of digital components of the particular media type on behalf of the respective content provider. User interaction data 111, which can be provided as input to one or more of the aforementioned machine learning models, can include one or more portions of user interaction data 111 obtained from client devices, data determined based on one or more portions of user interaction data 111, or a combination thereof (as described above).

For example, if one or more of the content platforms 150 have previously distributed one or more digital components of a second media type (e.g., text) to a particular subset of client devices 110 on behalf of content provider 160-1, but have not previously distributed one or more digital components of a first media type (e.g., video) to any client devices 110 on behalf of content provider 160-1, then the one or more of the content platforms 150 could, for instance, provide data indicating user interaction data 111 received from the particular subset of client devices 110 as input to the aforementioned first machine learning model corresponding to digital components of the first media type (e.g., video), so as to obtain, from the first machine learning model and based on the input, data specifying one or more expected quantities corresponding to the distribution of digital components 151 of the first media type (e.g., video) on behalf of content provider 160-1. In this example, such data specifying one or more expected quantities corresponding to the distribution of digital components 151 of the first media type (e.g., video) on behalf of content provider 160-1 can, in some implementations, include data specifying an expected quantity of resources (e.g., power, bandwidth, costs, time, etc.) consumed in distributing digital components 151 of the first media type (e.g., video) to the particular subset of client devices 110 on behalf of content provider 160-1, data specifying an expected quantity of affirmative actions performed by users of the particular subset of client devices 110 following initial user interactions with one or more digital components 151 of the first media type (e.g., video), data representing a ratio between the aforementioned expected quantity of resources consumed and the aforementioned expected quantity of affirmative actions performed, or a combination thereof.

Upon obtaining, from one of the k different machine learning models, result data specifying one or more expected quantities corresponding to with the distribution of digital components of a respective one of the k different media types to a subset of client devices 110 on behalf of a given content provider, in some implementations, one or more of the content platforms 150 may further generate a recommendation based on the result data and provide the recommendation to the given content provider. Such a recommendation may specify whether the given content provider should provide digital components of the respective one of the k different media types for distribution. In some implementations, such a recommendation may additionally or alternatively specify at least a portion of the one or more expected quantities. In some examples, such recommendations may be presented to parties associated with the content providers through one or more of a content provider account portal, email, text message, push notification, and the like.

For example, if one or more of the content platforms 150 have provided data indicating user interaction data 111 received from the particular subset of client devices 110 as input to the aforementioned first machine learning model corresponding to digital components of the first media type (e.g., video) and obtained, from the first machine learning model and based on the input, result data specifying one or more expected quantities corresponding to the distribution of digital components 151 of the first media type (e.g., video) on behalf of content provider 160-1, then the one or more of the content platforms 150 could, as depicted in FIG. 1, generate and provide a recommendation 152 to content provider 160-1. In this example, the recommendation 152 can specify whether the content provider 160-1 should provide digital components of the first media type (e.g., video), at least a portion of the one or more expected quantities, or a combination thereof.

In some implementations, one or more of the content platforms 150 may determine whether the one or more expected quantities satisfy one or more thresholds, respectively, and generate such a recommendation based at least in part on the determination. For instance, in response to determining that the one or more expected quantities satisfy (e.g., meets or exceeds) one or more thresholds, respectively, one or more of the content platforms 150 may generate a recommendation specifying that the given content provider should provide digital components of the respective one of the k different media types for distribution. On the other hand, in response to determining that the one or more expected quantities do not satisfy (e.g., does not exceed) one or more thresholds, respectively, one or more of the content platforms 150 may either (i) generate a recommendation specifying that the given content provider should not provide digital components of the respective one of the k different media types for distribution, or (ii) refrain from generating and providing a corresponding recommendation to the given content provider. As mentioned above, in some examples, such a recommendation may additionally or alternatively specify at least a portion of the one or more expected quantities, and may be presented to parties associated with the given content provider through one or more of a content provider account portal, email, text message, push notification, and the like.

For example, if one or more of the content platforms 150 obtain result data from the first machine learning model specifying one or more expected quantities corresponding to the distribution of digital components 151 of the first media type (e.g., video) on behalf of content provider 160-1 and determine that such one or more expected quantities exceed one or more thresholds, then the aforementioned recommendation 152 may specify that the content provider 160-1 should provide digital components of the first media type (e.g., video) for distribution. On the other hand, if the one or more of the content platforms 150 determine that such one or more expected quantities do not exceed one or more thresholds, then the aforementioned recommendation 152 may specify that the content provider 160-1 should not provide digital components of the first media type (e.g., video) for distribution. As mentioned above, the recommendation 152 can specify whether the content provider 160-1 should provide digital components of the first media type (e.g., video), at least a portion of the one or more expected quantities, or a combination thereof.

Such recommendations may advantageously enable content providers 160 to adjust the manner in which they provide digital components for distribution so as to reduce the expected quantity of resources (e.g., power, bandwidth, costs, time, etc.) consumed in distributing digital components 151 to client devices 110, increase the expected quantity of affirmative actions performed by users of such client devices 110 following initial user interactions with digital components 151, optimize the ratio between the aforementioned expected quantity of resources consumed and the aforementioned expected quantity of affirmative actions performed, or a combination thereof.

In some implementations, one or more of the functions described above with reference to content platforms 150 may be provided by way of one or more other computing devices in environment 100 (not shown) and/or communication with network 105. Furthermore, in some examples, environment 100 may include one or more relay servers or other appropriate data processing apparatuses (not shown) that serve a relay data over network 105 between various other components of environment 100.

Additional structural and operational aspects of components described above with reference to FIG. 1 are described with reference to FIG. 2.

Figure 2:
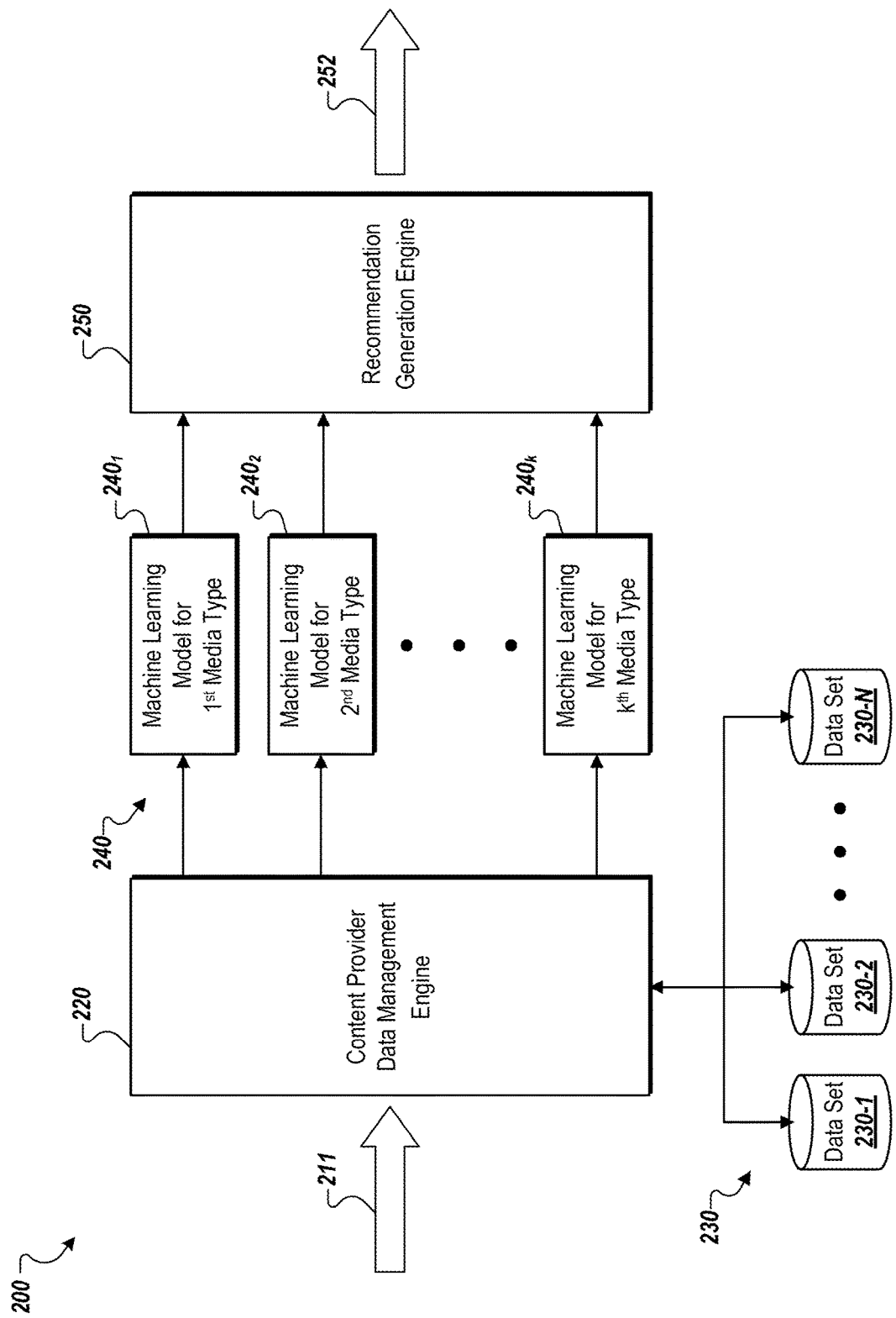
FIG. 2 is a block diagram of an exemplary system for recommending digital components of new media types for distribution.

FIG. 2 is an exemplary system 200 for recommending digital components of new media types for distribution. More particularly, the system 200 includes a content provider data management engine 220 and a recommendation generation engine 250. The system 200 also includes or maintains data sets 230 and machine learning models 240. Briefly, and as described in further detail below, the system 200 receives input data 211 from various client devices and provides output data 252 to various content providers based at least in part on the input data 211.

In some implementations, the system 200 may be included as part of content platforms 150 and be configured to carry out one or more of the operations described above with reference to content platforms 150. For instance, in some examples, the input data 211 and output data 252 may include data that is similar or equivalent to that of user interaction data 111 and recommendation 152 as described above with reference to FIG. 1, respectively. Similarly, in some examples, one or more of the machine learning models 240 may correspond to one or more of the machine learning models described above with reference to FIG. 1. As such, the machine learning models 240 may include one machine learning model for each of k different media types.

The content provider data management engine 220 obtains input data 211 from various client devices over time, which can include user interaction data provided by various client devices in connection with the distribution of digital components on behalf of various content providers. Such content providers may, in some examples, be similar or equivalent to content providers 160 as described above with reference to FIG. 1.

The content provider data management engine 220 stores or otherwise maintains portions of input data 211 corresponding to/linked with corresponding content providers as data sets 230. For instance, the content provider data management engine 220 may store or maintain input data 211 obtained in connection with the distribution of digital components on behalf of a content provider that is similar or equivalent to content provider 160-1 as data set 230-1, store or maintain input data 211 obtained in connection with the distribution of digital components on behalf of a content provider that is similar or equivalent to content provider 160-2 as data set 230-2, and store or maintain input data 211 obtained in connection with the distribution of digital components on behalf of a content provider that is similar or equivalent to content provider 160-N as data set 230-N. As such, data set 230-1 may include data similar or equivalent to user interaction data 111 obtained from various client devices to which digital components are distributed on behalf of content provider 160-1, data set 230-2 may include data similar or equivalent to user interaction data 111 obtained from various client devices to which digital components are distributed on behalf of content provider 160-2, and data set 230-N may include data similar or equivalent to user interaction data 111 obtained from various client devices to which digital components are distributed on behalf of content provider 160-N.

As mentioned above, such user interaction data 111 can include data indicative of one or more characteristics of the respective client device 110 and/or a user of the respective client device 110 (e.g., device type, device preference information, usage information, contextual information, etc.), data indicative of user interaction with one or more digital components 151 distributed to the respective client device 110 (e.g., data indicating whether and/or the manner in which the user interacted with one or more digital components, etc.), data indicative of affirmative actions performed by a user of the respective client device 110 following an initial user interaction with one or more digital components 151 distributed to the respective client device 110, or a combination thereof.

In addition, each of data sets 230 may also include additional data, such as data indicating digital components provided by the corresponding content provider, data indicating one or more conditions under which digital components provided by the corresponding content provider are to be distributed to client devices, data indicating the digital component media types previously provided by the corresponding content provider for distribution, and the like. In some implementations, the content provider data management engine 220 can generate or obtain data based at least in part on one or more of the aforementioned pieces of data and/or input data 211. In these implementations, the content provider data management engine 220 may also store or maintain such generated or obtained data in data sets 230. Data sets 230 may also include other information, such as various pieces of data received from content providers, information specifying quantities of resources (e.g., power, bandwidth, costs, time, etc.) consumed in distributing digital components on behalf of such content providers, and the like.

The system 200 can use input data 211 and/or other data included in data sets 230 to train machine learning models 240. In some examples, each of one or more of the machine learning models 240 may be a GBDT or otherwise leverage one or more gradient boosting ensemble techniques to perform inferences. In some implementations, for each of the k different machine learning models 240, the system 200 can identify, from among data sets 230, one or more data sets that are correspond to content providers that have previously provided digital components of a media type to which the respective machine learning model corresponds, and utilize data from the one or more identified data sets to train the respective machine learning model. For example, for machine learning model $240_1$ for the first media type (e.g., video), the system 200 may identify, from among data sets 230, one or more data sets that correspond to content providers that have previously provided digital components of a first media type (e.g., video), and utilize data from the one or more identified data sets to train the machine learning model for the first media type $240_1$.

Such training may be initially performed before machine learning models 240 are leveraged for generating recommendations, and may optionally be performed on an ongoing basis as more data is obtained by system 200 and added to data sets 230 so as to update and improve the performance of machine learning models 240 over time. In some implementations, one or more computing devices other than the system 200 may perform one or more of the aforementioned training processes, and simply pass data representing the trained machine learning models 240 to the system 200. In either case, input data 211 and/or other data included in data sets 230 to train machine learning models 240 may be utilized for purposes of training machine learning models 240. Machine learning models 240 may be trained using other data, as well.

Once the machine learning models 240 are at least initially trained, in some implementations, for each content provider, the content provider data management engine 220 monitors incoming input data 211 and data sets 230 over time to determine whether a minimum amount of data corresponding to the respective content provider has been obtained.

Additionally or alternatively at this juncture, for each content provider, the content provider data management engine 220 determines whether the respective content provider has not previously provided digital components of any of the k different media types for distribution. In response to determining that the respective content provider has not previously provided digital components of one or more of the k different media types for distribution, the content provider data management engine 220 obtains data corresponding to the respective content provider, which may include obtaining input data 211 and/or obtaining data from a corresponding one of the data sets 230, and provides such data as input to one or more of the k different machine learning models 240 that correspond to one or more of the k different media types, respectively. In some implementations, the content provider data management engine 220 obtains and provides such data as input to one or more of the k different machine learning models 240 in response to (i) determining that the respective content provider has not previously provided digital components of one or more of the k different media types for distribution, and (ii) determining that a minimum amount of data corresponding to the respective content provider has been obtained.

For example, if the content provider data management engine 220 determines that the content provider corresponding to data set 230-1 has previously provided digital components of a second media type (e.g., text) for distribution, but has not previously provided digital components of a first media type (e.g., video) for distribution, then the content provider data management engine 220 can, for instance, obtain input data 211 and/or included in data set 230-1 and provide the aforementioned data as input to the machine learning model for the first media type $240_1$.

After the content provider data management engine 220 provides input data corresponding to a given content provider to one or more of the machine learning models 240, the recommendation generation engine 250 obtains result data from the one or more of the machine learning models 240 generated based at least in part on the input data. In some implementations, the result data obtained from each machine learning model 240 includes data specifying one or more expected quantities corresponding to the distribution of digital components of the media type to which the respective machine learning model 240 corresponds, on behalf of the given content provider. For example, the result data obtained from each machine learning model 240 can, in at least some of these implementations, include data specifying an expected quantity of resources (e.g., power, bandwidth, costs, time, etc.) consumed in distributing digital components of the media type to which the respective machine learning model 240 corresponds, on behalf of the given content provider, data specifying an expected quantity of affirmative actions performed by users of client devices following initial user interactions with one or more digital components of the media type to which the respective machine learning model 240 corresponds, on behalf of the given content provider, data representing a ratio between the aforementioned expected quantity of resources consumed and the aforementioned expected quantity of affirmative actions performed, or a combination thereof.

Based on the result data obtained from the respective machine learning model 240, the recommendation generation engine 250 generates a recommendation 252 based at least in part on the result data and provides the recommendation 252 to the given content provider. Such a recommendation 252 may specify whether the given content provider should provide digital components of the media type to which the respective machine learning model 240 corresponds, for distribution. In some implementations, such a recommendation 252 may additionally or alternatively specify at least a portion of the one or more expected quantities reflected in the result data obtained from the respective machine learning model 240. In some examples, the recommendation generation engine 250 provides the recommendation 252 to the given content provider through one or more of an account portal accessible to the given content provider, email, text message, push notification, and the like. As such, in some examples, the recommendation generation engine 250 provides the recommendation 252 to the given content provider over one or more communication networks similar or equivalent to that of network 105 as described above with reference to FIG. 1. In some implementations, the recommendation 252, itself, includes digital components of one or more media types.

In some implementations, the recommendation generation engine 250 determines whether the one or more expected quantities reflected in the result data obtained from the respective machine learning model 240 satisfy one or more thresholds, respectively, and generates the recommendation 252 based at least in part on the determination. For instance, in response to determining that the one or more expected quantities satisfy one or more thresholds, respectively, the recommendation generation engine 250 may generate the recommendation 252 to indicate that the given content provider should provide digital components of the media type to which the respective machine learning model 240 corresponds, for distribution. On the other hand, in response to determining that the one or more expected quantities do not satisfy one or more thresholds, respectively, the recommendation generation engine 250 may either (i) generate the recommendation 252 so as to indicate that the given content provider should not provide digital components of the media type to which the respective machine learning model 240 corresponds, for distribution, or (ii) refrain from generating and providing a corresponding recommendation to the given content provider.

Figure 3:
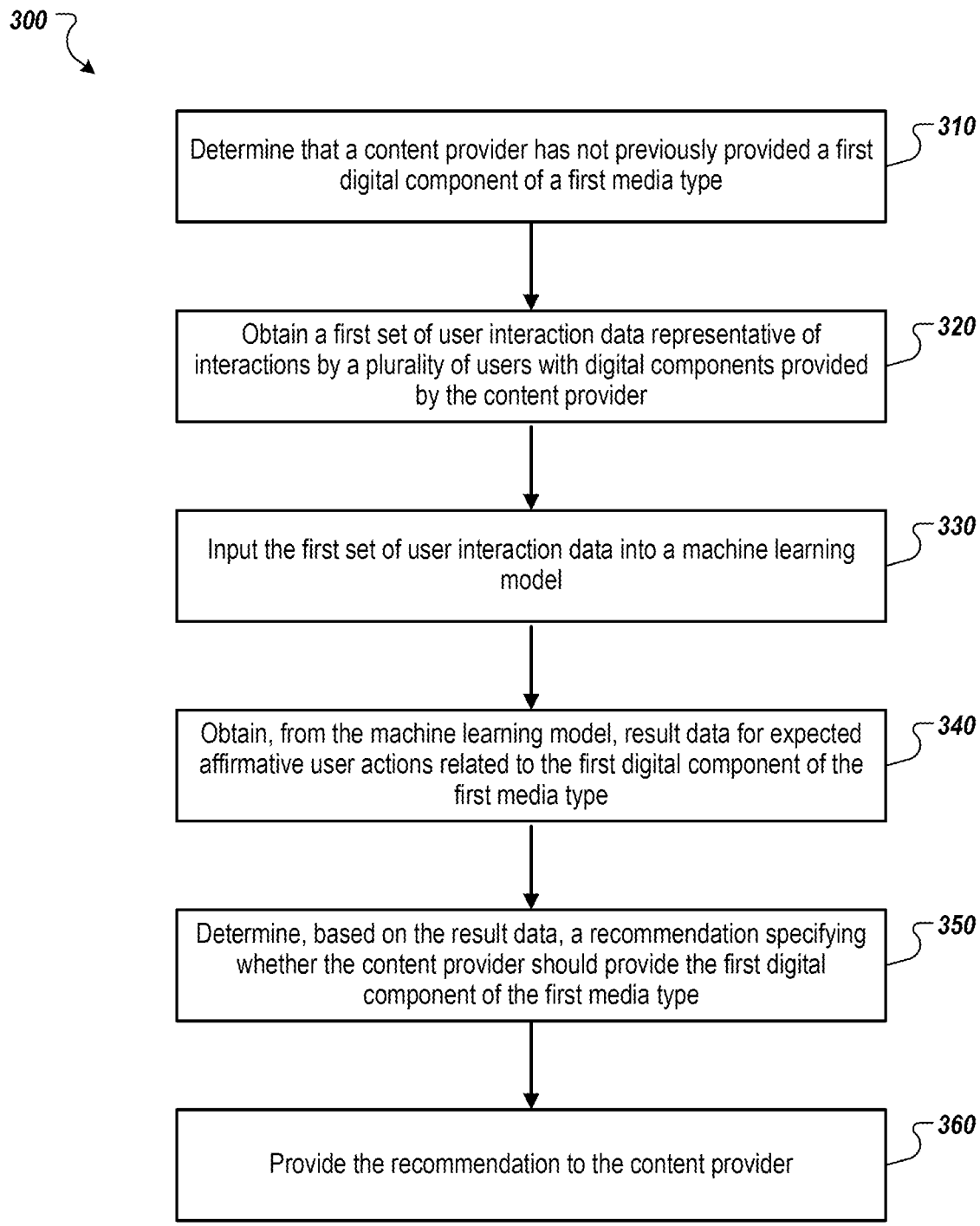
FIG. 3 is a flow diagram of an example process for recommending digital components of new media types for distribution.

FIG. 3 is a flow diagram of an example process 300 for recommending digital components of new media types for distribution. Operations of process 300 are described below as being performed by the components of the system described and depicted in FIGS. 1 and 2, such as one or more content platforms 150 and one or more components of system 200. Operations of the process 300 are described below for illustration purposes only. Operations of the process 300 can be performed by any appropriate device or system, e.g., any appropriate data processing apparatus. Operations of the process 300 can also be implemented as instructions stored on a computer readable medium which may be non-transitory. Execution of the instructions causes one or more data processing apparatus to perform operations of the process 300.

The system determines that a content provider has not previously provided a first digital component of a first media type (310). In some implementations, this step corresponds to one or more operations that are similar or equivalent to one or more operations that are performed in connection with the content provider data management engine 220 in determining that a given content provider, such as a content provider corresponding to data set 230-1, has previously provided digital components of one or more of the k media types other than the first media type (e.g., video), for distribution (as described above with reference to FIGS. 1 and 2). For purposes of example, the content provider corresponding to/linked with data set 230-1 is also referred to below as content provider 160-1. In some implementations, the first media type corresponds to one of video, audio, image, or text.

The system obtains a first set of user interaction data representative of interactions by a plurality of users with digital components provided by the content provider (320). In some implementations, this step may correspond to one or more operations that are similar or equivalent to one or more operations that are performed in connection with the content provider data management engine 220 obtaining input data 211 from various client devices to which digital components have been distributed on behalf of content provider 160-1 and/or data included in data set 230-1 (as described above with reference to FIGS. 1 and 2). In some implementations, the first set of user interaction data includes data user interaction data described above with reference to FIGS. 1 and 2, including data indicating one or more characteristics of the plurality of users and/or a plurality of client devices corresponding to the plurality of users, respectively, data relating to the nature, number, and/or duration of user interactions with one or more digital components, or a combination thereof.

The system inputs the first set of user interaction data into a machine learning model (330). In some implementations, the machine learning model is trained on (i) historical user interaction data for digital components of the first media type that are provided by a plurality of other content providers and (ii) corresponding data for affirmative user actions relating to the digital components of the first media type. As described above with reference to FIGS. 1 and 2, an affirmative user action relating to a digital component represents performance by a user of a target action after an initial user interaction with the digital component.

Moreover, based on the input first set of user interaction data, the machine learning model outputs data for expected affirmative user actions related to a particular digital component of the first media type based on an input set of user interaction data. In some implementations, and as described above with reference to FIGS. 1 and 2, this step corresponds to one or more operations that are similar or equivalent to one or more operations that are performed in connection with the content provider data management engine 220 providing the input data 211 obtained in connection with the content provider 160-1 and/or data obtained from data set 230-1 as input to the machine learning model for the first media type $240_1$, which is trained based on input data 211 obtained from client devices in connection with the distribution of digital components of the first media type to such client devices and/or other data included in one or more of data sets 230 that are linked with one or more content providers that have previously provided digital components of the first media type for distribution, such as data sets 230-2 and 230-N, which may be linked with content providers similar or equivalent to that of content providers 160-2 and 160-N, respectively.

In some implementations, the machine learning model uses gradient boosting ensemble techniques. Furthermore, in some implementations, the machine learning model corresponds to one of a plurality of different machine learning models that each in turn correspond to a different media type.

The system obtains, from the machine learning model, result data for expected affirmative user actions related to the first digital component of the first media type (340). In some implementations, this step corresponds to one or more operations that are similar or equivalent to one or more operations that are performed in connection with the recommendation generation engine 250 obtaining result data from the machine learning model for the first media type $240_1$ (as described above with reference to FIG. 2).

As described above, such result data can include data specifying one or more expected quantities corresponding to the distribution of digital components of the first media type on behalf of the content provider which, in some implementations, can include data specifying an expected quantity of resources consumed in distributing digital components of the first media type to the plurality of users on behalf of the content provider, data specifying an expected quantity of affirmative actions performed by the plurality of users following initial user interactions with one or more digital components of the first media type, data representing a ratio between the aforementioned expected quantity of resources consumed and the aforementioned expected quantity of affirmative actions performed, or a combination thereof.

In some implementations, data relating to affirmative user actions that are expected for the first digital component of the first media type includes a first data item specifying an expected number of resources consumed in obtaining an expected affirmative user action relating to the first digital component of the first media type, a second data item representing an expected number of affirmative user actions relating to the first digital component of the first type relative to the expected number of resources consumed, or both. In some examples, one or both of the first and second data items may correspond to data indicating one or more of the aforementioned expected quantities.

The system determines, based on the result data, a recommendation specifying whether the content provider should provide the first digital component of the first media type (350). In some implementations, this step corresponds to one or more operations that are similar or equivalent to one or more operations that are performed in connection with the recommendation generation engine 250 generating recommendation 252 based on the result data obtained from the machine learning model for the first media type $240_1$ (as described above with reference to FIG. 2).

For at least some implementations in which data relating to affirmative user actions that are expected for the first digital component of the first media type includes one or both of the aforementioned first and second data items, determine the recommendation based on the result data includes determining whether (1) the first data item satisfies a first threshold and (2) the second data item satisfies a second threshold. If the system determines that the first data item satisfies a first threshold and the second data item satisfies a second threshold, the system generates a recommendation specifying that the content provider should provide the first digital component of the first media type. On the other hand, if the system determines that the first data item does not satisfy the first threshold and/or the second data item does not satisfy the second threshold, the system generates a recommendation specifying that the content provider should not provide the first digital component of the first media type.

The system provides the recommendation to the content provider (360). In some implementations, this step may correspond to one or more operations that are similar or equivalent to one or more operations that are performed in connection with the recommendation generation engine 250 providing recommendation 252 to content provider 160-1 (as described above with reference to FIGS. 1 and 2).

Thus, in this manner, the system provides the content provider with a recommendation specifying whether the content provider should provide digital components of a new media type (i.e., a media type for which the content provider has previously not provided a digital component). The recommendation may advantageously enable the content provider to adjust the manner in which it provides digital components for distribution to reduce the expected quantity of resources (e.g., power, bandwidth, costs, time, etc.) consumed in distributing digital components, increase the expected quantity of affirmative actions performed by the plurality of users, optimize the ratio between the aforementioned expected quantity of resources consumed and the aforementioned expected quantity of affirmative actions performed, or a combination thereof.

Figure 4:
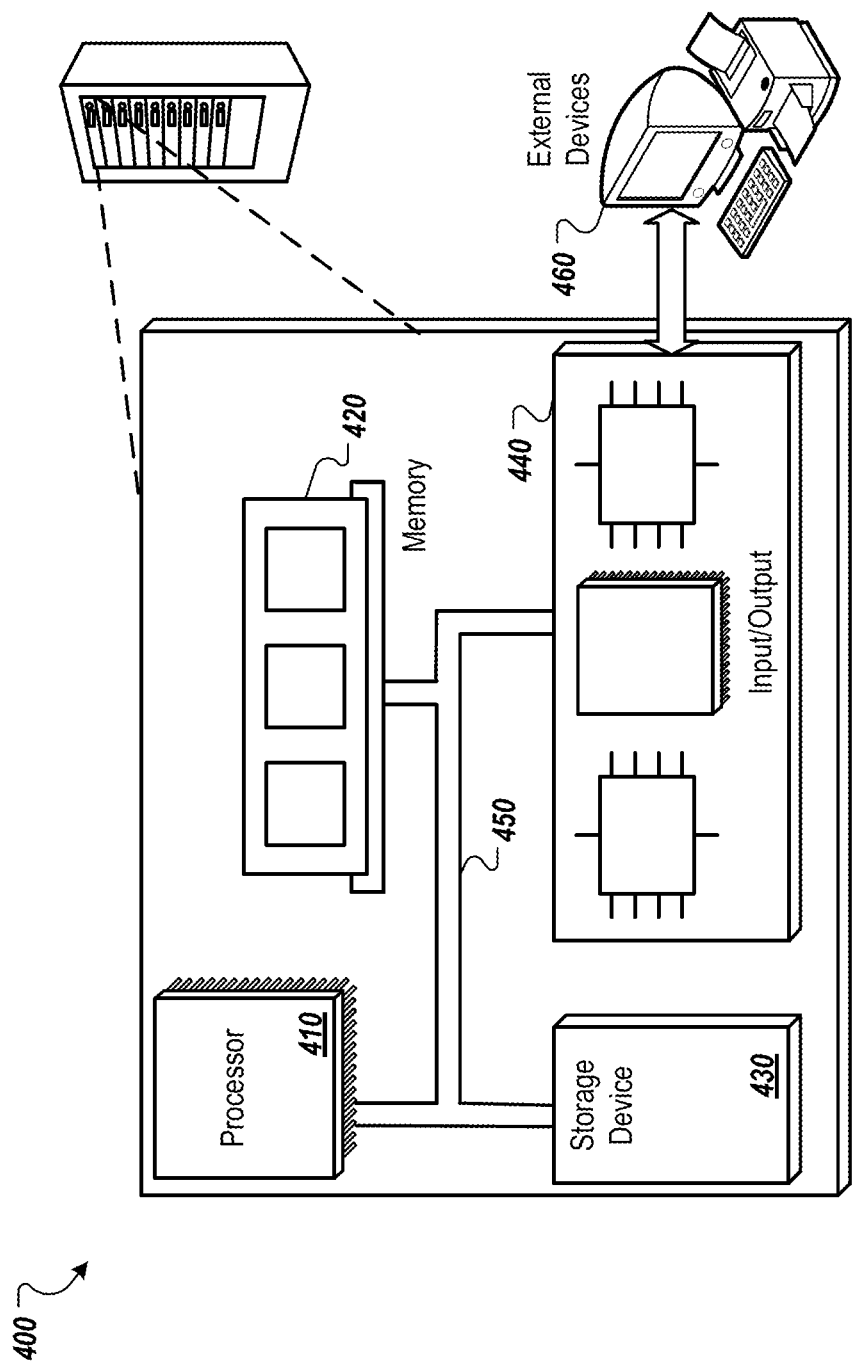
FIG. 4 is a block diagram of an example computer system that can be used to perform operations described.

FIG. 4 is block diagram of an example computer system 400 that can be used to perform operations described above.

The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining that a content provider has not previously provided a first digital component of a first media type, including determining that the content provider has previously provided digital components of one or more media types other than the first media type;
   obtaining a first set of user interaction data representative of interactions by a plurality of users with digital components provided by the content provider;
   inputting the first set of user interaction data into a machine learning model, wherein:
   the machine learning model is trained on (i) historical user interaction data for digital components of the first media type that are provided by a plurality of other content providers and (ii) corresponding data for affirmative user actions relating to the digital components of the first media type,
   the machine learning model outputs data for expected affirmative user actions related to a particular digital component of the first media type based on an input set of user interaction data, and
   affirmative user action relating to a digital component represents performance by a user of a target action after an initial user interaction with the digital component;
   obtaining, from the machine learning model and based on the first set of user interaction data, result data for expected affirmative user actions related to the first digital component of the first media type;
   determining, based on the result data for expected affirmative user actions related to the first digital component of the first media type, a recommendation specifying whether the content provider should provide the first digital component of the first media type; and
   providing, to the content provider, the recommendation specifying whether the content provider should provide the first digital component of the first media type.

2. The computer-implemented method of claim 1, wherein the first media type comprises one of video, audio, image, or text.

3. The computer-implemented method of claim 1, wherein first user interaction data includes data indicating to one or more of the following: one or more characteristics of the plurality of users, one or more characteristics of a plurality of client devices correspond to the plurality of users, a number of user interactions with one or more digital components of the first media type, and a duration of user interactions with one or more digital components of the first media type.

4. The computer-implemented method of claim 1, wherein the machine learning model uses gradient boosting ensemble techniques.

5. The computer-implemented method of claim 1, wherein the machine learning model corresponds to one of a plurality of different machine learning models that each correspond to a different media type.

6. The computer-implemented method of claim 1, wherein data relating to affirmative user actions that are expected for the first digital component of the first media type comprises at least one of:
- a first data item specifying an expected number of resources consumed in obtaining an expected affirmative user action relating to the first digital component of the first media type; or
- a second data item representing an expected number of affirmative user actions relating to the first digital component of the first type relative to the expected number of resources consumed.

7. The computer-implemented method of claim 6, wherein determining the recommendation includes:
- determining whether (1) the first data item satisfies a first threshold and (2) the second data item satisfies a second threshold; and
- generating the recommendation based on whether the (1) the first data item satisfies the first threshold and (2) the second data item satisfies the second threshold, including:
- generating a recommendation specifying that the content provider should provide the first digital component of the first media type when (1) the first data item satisfies the first threshold and (2) the second data item satisfies the second threshold; and
- generating a recommendation specifying that the content provider should not provide the first digital component of the first media type when (1) the first data item does not satisfy the first threshold and (2) the second data item does not satisfy the second threshold.

8. The computer-implemented method of claim 7, wherein providing the recommendation regarding whether the content provider should provide the digital component of the first media type includes providing the first and second data items.

9. A system, comprising:
- one or more memory devices storing instructions; and
- one or more data processing apparatus that are configured to interact with the one or more memory devices, and upon execution of the instructions, perform operations including:
- determining that a content provider has not previously provided a first digital component of a first media type, including determining that the content provider has previously provided digital components of one or more media types other than the first media type;
- obtaining a first set of user interaction data representative of interactions by a plurality of users with digital components provided by the content provider;
- inputting the first set of user interaction data into a machine learning model, wherein:
- the machine learning model is trained on (i) historical user interaction data for digital components of the first media type that are provided by a plurality of other content providers and (ii) corresponding data for affirmative user actions relating to the digital components of the first media type,
- the machine learning model outputs data for expected affirmative user actions related to a particular digital component of the first media type based on an input set of user interaction data, and affirmative user action relating to a digital component represents performance by a user of a target action after an initial user interaction with the digital component; obtaining, from the machine learning model and based on the first set of user interaction data, result data for expected affirmative user actions related to the first digital component of the first media type; determining, based on the result data for expected affirmative user actions related to the first digital component of the first media type, a recommendation specifying whether the content provider should provide the first digital component of the first media type; and providing, to the content provider, the recommendation specifying whether the content provider should provide the first digital component of the first media type.

10. The system of claim 9, wherein the first media type comprises one of video, audio, image, or text.

11. The system of claim 9, wherein first user interaction data includes data indicating to one or more of the following: one or more characteristics of the plurality of users, one or more characteristics of a plurality of client devices correspond to the plurality of users, a number of user interactions with one or more digital components of the first media type, and a duration of user interactions with one or more digital components of the first media type.

12. The system of claim 9, wherein the machine learning model uses gradient boosting ensemble techniques.

13. The system of claim 9, wherein the machine learning model corresponds to one of a plurality of different machine learning models that each correspond to a different media type.

14. The system of claim 9, wherein data relating to affirmative user actions that are expected for the first digital component of the first media type comprises at least one of:
- a first data item specifying an expected number of resources consumed in obtaining an expected affirmative user action relating to the first digital component of the first media type; or
- a second data item representing an expected number of affirmative user actions relating to the first digital component of the first type relative to the expected number of resources consumed.

15. The system of claim 14, wherein determining the recommendation includes: determining whether (1) the first data item satisfies a first threshold and (2) the second data item satisfies a second threshold; and generating the recommendation based on whether the (1) the first data item satisfies the first threshold and (2) the second data item satisfies the second threshold, including: generating a recommendation specifying that the content provider should provide the first digital component of the first media type when (1) the first data item satisfies the first threshold and (2) the second data item satisfies the second threshold; and generating a recommendation specifying that the content provider should not provide the first digital component of the first media type when (1) the first data item does not satisfy the first threshold and (2) the second data item does not satisfy the second threshold.

16. The system of claim 15, wherein providing the recommendation regarding whether the content provider should provide the digital component of the first media type includes providing the first and second data items.

17. A non-transitory computer readable medium storing instructions that, when executed by one or more data processing apparatus, cause the one or more data processing apparatus to perform operations comprising:
  determining that a content provider has not previously provided a first digital component of a first media type, including determining that the content provider has previously provided digital components of one or more media types other than the first media type;
  obtaining a first set of user interaction data representative of interactions by a plurality of users with digital components provided by the content provider;
  inputting the first set of user interaction data into a machine learning model, wherein:
    the machine learning model is trained on (1) historical user interaction data for digital components of the first media type that are provided by a plurality of other content providers and (ii) corresponding data for affirmative user actions relating to the digital components of the first media type,
    the machine learning model outputs data for expected affirmative user actions related to a particular digital component of the first media type based on an input set of user interaction data, and
    affirmative user action relating to a digital component represents performance by a user of a target action after an initial user interaction with the digital component;
  obtaining, from the machine learning model and based on the first set of user interaction data, result data for expected affirmative user actions related to the first digital component of the first media type;
  determining, based on the result data for expected affirmative user actions related to the first digital component of the first media type, a recommendation specifying whether the content provider should provide the first digital component of the first media type; and
  providing, to the content provider, the recommendation specifying whether the content provider should provide the first digital component of the first media type.

18. The non-transitory computer readable medium of claim 17, wherein the first media type comprises one of video, audio, image, or text and wherein first user interaction data includes data indicating to one or more of the following: one or more characteristics of the plurality of users, one or more characteristics of a plurality of client devices correspond to the plurality of users, a number of user interactions with one or more digital components of the first media type, and a duration of user interactions with one or more digital components of the first media type.

19. The non-transitory computer readable medium of claim 17, wherein the machine learning model uses gradient boosting ensemble techniques and wherein the machine learning model corresponds to one of a plurality of different machine learning models that each correspond to a different media type.

20. The non-transitory computer readable medium of claim 17, wherein data relating to affirmative user actions that are expected for the first digital component of the first media type comprises at least one of:
  a first data item specifying an expected number of resources consumed in obtaining an expected affirmative user action relating to the first digital component of the first media type; or
  a second data item representing an expected number of affirmative user actions relating to the first digital component of the first type relative to the expected number of resources consumed.

* * * * *